United States Patent [19]

Rankowitz

[11] 4,021,584
[45] May 3, 1977

[54] PROCESS FOR FIBERED MEAT ANALOGS

[75] Inventor: Marshall Miles Rankowitz, Hartsdale, N.Y.

[73] Assignee: General Foods Corporation, White Plains, N.Y.

[22] Filed: Aug. 6, 1975

[21] Appl. No.: 602,347

[52] U.S. Cl. .............................. 426/242; 426/274; 426/302; 426/656; 426/657; 426/802

[51] Int. Cl.² .......................................... A23J 3/00

[58] Field of Search ............ 426/92, 93, 104, 242, 426/274, 297, 302, 309, 574, 656, 657, 802, 241

[56] References Cited

UNITED STATES PATENTS

| | | | |
|---|---|---|---|
| 3,343,963 | 9/1967 | Kjelson | 426/104 X |
| 3,498,793 | 3/1970 | Page et al. | 426/274 |
| 3,644,121 | 2/1972 | Bayer et al. | 426/274 |
| 3,840,679 | 10/1974 | Liepa et al. | 426/104 |
| 3,886,299 | 5/1975 | Feldbrugge et al. | 426/802 X |
| 3,898,345 | 8/1975 | Horrocks et al. | 426/104 X |

*Primary Examiner*—Raymond N. Jones
*Assistant Examiner*—Esther L. Massung
*Attorney, Agent, or Firm*—Thaddius J. Carvis; Daniel J. Donovan; Bruno P. Struzzi

[57] ABSTRACT

Disclosed is a process for preparing large chunks or loaves of textured protein material. The process in its preferred aspects comprises: forming a plurality of substantially unpuffed, fibrous protein strips by compressing, elongating, and heating an aqueous dough mixture and releasing the compression; fibrilating the strips; soaking the strips in a binder medium based on egg albumen; layering the strips to align the fibers and to substantially eliminate voids; and heat setting the binder, preferably by microwave energy.

2 Claims, No Drawings

PROCESS FOR FIBERED MEAT ANALOGS

BACKGROUND OF THE INVENTION

The present invention relates to the production of proteinaceous food products of a fibrous nature, and more particularly, to a process for preparing large chunks or loaves of protein having a meat like texture.

The food industry has, for many years, attempted to provide high protein, low cost fibrous proteinaceous material as a substitute for meat. This effort has been amplified recently due to the relative shortages and high prices for natural meat products. Early efforts to provide meat analog products were developed around a simplified model of natural meat which comprised a system of fibers held together by a suitable binder. To simulate the fibrous texture of natural meat, synthetic textile fiber technology was applied to the preparation of protein fibers which could be bound together to form a meat-like mass. A basic patent disclosing means of spinning proteinaceous fibers for meat analogs is Boyer, U.S. Pat. No. 2,682,466, issued June 29, 1954. Since then, numerous patents have issued employing similar proteinaceous fibers. Among these are U.S. Pat. No. 3,320,070 issued to W. E. Hartman, which discloses mixing vegetable protein fibers with an albumen binder and then heat setting. In another recent U.S. Pat. No. 3,772,035 to A. E. Carp et al., a process is disclosed for producing a meat analog by preparing a number of bundles of oriented spun protein fibers, impregnating these bundles with an albumen binder, heat setting the surface portions of these bundles, and then assembling the bundles for final coagulation under heat and pressure. While these spinning techniques have produced satisfactory meat analog products, they require extensive capital cost outlays and require high processing expenditures. Moreover, because the fibers are based upon soy protein, the resulting products are nutritionally deficient unless the distribution of essential amino acids is modified by suitable additives. Additionally, the more sophisticated and discriminating consumers were readily able to differentiate the texture of these products from chunks of natural meats.

Because of the inherent limitations associated with the meat analog products based upon spun protein fibers, other techniques for producing products of this type have been investigated. For example, in U.S. Pat. No. 3,047,395 to Rusoff, et al., there was disclosed an autoclaving process which eliminated the need for spun protein fibers. According to that disclosure, a protein slurry was rapidly heated under continuous agitation to cause coagulation of the protein into a fibrous mass. Rapid cooling of the protein resulted in a shred-like fibrous material which was recovered at rather low yield.

Further recent patents have disclosed methods based upon the extrusion of protein materials to develop a fibrous or fiber-like structure. The economies inherent in such processes were believed to outweigh any loss in fiber identity which these products might have as compared to the spun fiber analogs. By extruding larger fibrous materials, it was hoped that the need for binding the smaller segments could be eliminated. For example, the U.S. Pat. Nos. to Atkinson, 3,480,442 and 3,488,770, and to Jenkins, 3,496,858 suggest extruding vegetable protein material from an area of high pressure to an area of reduced pressure to produce an expanded mass or rope of proteinaceous material. The sudden expansion from high pressure to atmospheric pressure caused expansion in the direction of flow which produced the appearance of fibers.

A process capable of preparing a greatly improved fibrous product by extrusion is disclosed in U.S. patent application Ser. No. 309,301 filed Nov. 24, 1972 by A. Feldbrugge et al, now U.S. Pat. No. 3,886,299. According to this procedure, a highly-fibrous, substantially-unpuffed product simulating the muscle of animals or the flesh of fish is produced. That process calls for preparing a mixture containing above 35% by weight heat coagulable protein; adjusting the moisture content of the mixture to 25% – 65% water; blending the water and protein mixture to form a dough having a fibrous character when stretched; compressing the dough in a chamber wherein the volume of the channel between flights of the screw is decreased 2/1 or more from feed to discharge of the chamber to degas and densify the dough into a unitary body, said chamber formed by a heated outer wall and the channel of a rotating screw, said wall heated in excess of 250° F; simultaneously heating the dough and elongating the dough while the dough is under compression to a heat set, thermally-coagulated fibrous product having fiber alignment in the direction of the channel; releasing the compression on the product without forcing the product through a dye while maintaining a pressure drop below 100 psi thereby causing 20% or less puffing of the product and while maintaining the aligned fibrous condition of the product; and recovering the fibrous product. The disclosure of this application is hereby incorporated by reference. The present invention provides an improvement upon this process and provides a product which more nearly equals the textural characteristics of natural meat and fish.

SUMMARY OF THE INVENTION

Although it is possible according to the Feldbrugge et al. process to prepare large chunks or slabs or even loaves of fibrous protein product, it now appears that there are definite textural advantages which can be obtained by avoiding the natural tendency to extrude the products in the sizes required. Thus, it has been discovered according to the present invention that the textural characteristics of the products of that process can be greatly improved by forming the product in thin strips, soaking the strips in a binder medium based on egg albumen, layering the strips to generally align the fibers in the strips, and substantially eliminate voids, and heat setting the binder. According to a preferred embodiment of the present invention, the strips are fibrillated by mechanically working them to open spaces in the product and to cause lines of breaking in the general direction of fiber orientation. This intermediate fibrillating step provides spaces wherein the egg albumen binder can reside to modify the texture of the strips. It has also been discovered, and is a preferred embodiment of the present invention, that where the heating is done by microwave energy, a shrinking and tightening of the entire simulated meat structure occurs to provide a more realistic appearance and mouth feel to the product.

DETAILED DESCRIPTION OF THE INVENTION

By employing the process of the present invention, the substantially unpuffed, fibrous protein material prepared according to the disclosure of U.S. pat. application Ser. No. 309,301 filed Nov. 24, 1972, is greatly improved. The disclosure of that application is hereby incorporated by reference.

According to that process, a moist dough of coaguable proteinaceous material is compressed into a unitary body within the chamber of decreasing volume formed by a heated outer wall and an internally rotating screw (auger). The volume along the length of the screw is reduced preferably two times or more from the feed end to the outlet. The pressure exerted due to the reduction in volume of the chamber forces a compaction of the protein normal to the channel of the screw thereby aligning the protein in the direction of the channel. Simultaneously, the heated outer wall transfers sufficient heat to the compressed and stretched mass of protein to plasticize the material and heat set the material into a dense fibrous mass which is extruded from the chamber. The heat set material is extruded without a substantial increase in volume over that present in the channel just prior to extrusion. The clearance between the heated surface, normally cylindrical or conical in nature, and the rotating screw is adjusted to minimize back mixing of the proteinaceous material and to quickly heat, stretch, and orient the proteinaceous mass in a direction parallel to the auger channel.

Pressure is necessary to compact the proteinaceous material to a point where it is substantially free of voids, to assure proper material flow and rapid heat transfer by conduction from the heated surface to the proteinaceous material. The pressure is maintained at the minimum amount necessary to accomplish compression and to force the material through the chamber of reduced volume since excessive back pressure disrupts the oriented proteinaceous mass.

The chamber surface provides a frictional resistance to the flow of the proteinaceous material which causes stretching or elongation of the material in the direction of the screw channel, thus, forming a dense, layered, continuous fibrous product. As the fibrous nature of the protein is developed, the heat transferred from the heated surface irreversibly sets the protein into a fibrous mass. The product issuing from the chamber is preferably recovered avoiding any significant pressure drop, thus, insuring that back pressures, other than the resistance of the heated wall and screw, do not cause disruption of the oriented or fibrous nature of the protein. Conventional dies employed for puffing are not employed, but where shaping is desired, a construction of the type disclosed by Page et al., U.S. Pat. No. 3,559,561 can be employed to shape the material while minimizing puffing and disruption of the fibers. The pressure drop to atmospheric, from the greatest pressure in the mass compressed by the rotating auger and the walls, should be minimized to limit expansion or puffing to 20% or less, preferably to 10% or less, and more preferably below 5% volume increase. Pressure drops well below 100 psi are typical.

According to the present invention, material prepared in this manner is preferably extruded in thin strips having a thickness of no more than about 0.25 inches, more preferably 0.10 inches. However, if desired, the material can be extruded to a thickness two or three times this dimension, and may then be passed through a set of rollers to bring it to within the indicated size range. Advantageously, the passage through the rollers will also, to some extent, fibrillate the strips, separating the mass along lines of weakness thereby defining a fibrillated fibrous structure.

In preparing the protein strips according to this procedure, the protein material must have several critical properties.

It must contain a minimum percentage of undenatured protein, that is, protein that has neither been heat-treated, nor otherwise processed to the point where it is no longer coagulable.

The concentration of the protein necessary for fiber formation will vary according to the quality and source of the protein. Raw meat, fish, and vegetable protein materials can be employed. Suitable vegetable protein sources are soy bean meal, peanut meal, cottonseed, or other vegetable protein materials generally recovered as by-products from oil extraction. Full fat proteinaceous sources may be employed, but concentrated sources of the protein material are preferred to maximize the protein content of the dough. The muscle of animals, flesh of fish, soy isolate, gluten, albumen, dairy products such as dry milk powder, whey and the like, wheat flour and other protein sources are useful. Inexpensive meat, poultry or fish not having utility for direct sale to consumers, such as poultry paste recovered from laying chickens, are a preferred source of animal protein. Proteins such as protein isolates, defatted soy flour and particularly wheat gluten are preferred vegetable derived proteinaceous sources.

Proteinaceous materials are subdivided (preferably flours of these materials are employed) and mixed to form a moist dough having a moisture content of between 20% to 65% water, as is basis. Flours having a particle size of 80 mesh or finer, are particularly good for forming a uniform initial dough. Where meat materials are employed, it is necessary to partially dehydrate the meat by known drying methods or mix the meat with dry vegetable protein sources or other materials, to reduce the moisture content required for processing. Of course, heat treatment on drying of meat or fish will cause denaturization and, therefore, it is preferred to employ meat only as an additive or supplementary source of protein to dry vegetable protein which will comprise a major portion of the dough.

Other materials may be mixed with the proteins. For example, carbohydrates such as starch, fillers, colors, fats and other flavoring ingredients may be added to the proteinaceous material. Wheat flour has been found to be an extremely useful additive since it provides some gluten useful in fiber development and is readily cooked and gelatinized during the process to produce a desirable flavor and texture in the product. However, defatted soy bean flour also provides sufficient carbohydrates and a better protein value in the finished product.

It is important to mix the material with water sufficient to as uniformly as possible distribute the water in the proteinaceous material.

The fibers are developed and set by subjecting the moist proteinaceous dough to compression in a chamber of decreasing volume formed by a heated outer wall and a rotating screw such that the pressure exerted by the reduction in volume as the outlet of the chamber is approached has densified the dough but does not cause substantial expansion. The compression forces the dough into a dense unitary body conforming to the chamber formed between the screw and the wall. The compression removes voids, expels air, and forms a dense proteinaceous mass. Simultaneously, the compression against the heated outer wall allows rapid heat transfer into the mass, plasticizing the mass as it is forced towards the outlet of the extruder. The continuous turning of the screw, the resistance of the heated wall, and the volume reduction cause a stretching of the plastic mass forming a fibrous texture which is usually aligned in the direction of the channel of the screw and simultaneously the fibers are heated to the point of forming a heat irreversible proteinaceous mass. The fibers are, thus, simultaneously stretched and oriented in layers or planes normal to the heated surface. The heat set fibers are then expelled from the extruder without puffing to retain the dense meat-like structure formed within the extruder.

Formation of the fibers is conveniently done by feeding a premixed dough to an extruder of the type normally employed in the plastics industry having a minimum clearance between the periphery of the screw and the heated wall, and preferably, having a minimum clearance between the base of the channel formed by the flights of the screw and the heated wall. By this design, the heat transfer surface area to volume of the protein mass being treated is maximized. The extruder should be designed to provide a reduction in volume from feed to discharge in the screw channel, or from 1 to 10 fold, preferably 1 to 5 fold.

The wall is normally heated to a temperature of at least 250° F and preferably to an average temperature of 280° F or greater. It is preferred to employ multiple zones of heat to provide proper temperature control throughout the barrel of the extruder. The heated surface cooks the carbohydrate content of the dough and raises the temperature of the dough to a point where the the protein coagulates. Simultaneously, the screw, rotating in relationship to the heated wall, causes a stretching effect, aligning the material within the screw channel as the protein is being coagulated. The rotating screw and heated wall is closely aligned to limit slippage or backmixing during stretching and coagulation of the fibers.

The minimum speed of screw rotation is determined by the speed necessary for a given extruder to prevent charring or browning of the proteinaceous material as it is being treated. The exact operating conditions are not critical provided sufficient reduction in volume is available to insure proper compression to a dense mass, stretching and coagulation of the protein. If desired, the screw of the extruder may be heated to further increase the surface area present for a given mass of proteinaceous material, and may be further designed to provide a first mixing stage wherein the temperature of the proteinaceous mass is increased to a point incipient to coagulation whereupon the screw is designed to provide a reduction in volume to compress, elongate, and orient the protein during coagulation. The first mixing stage may also be employed to mix ingredients and form the fibrous dough. Thus, large amounts of material may be mixed initially in deep flights in a screw, and upon formation of the dough and reaching coagulation temperature, the volume of the screw channel reduced to maximize the heated surface to mass relationship during elongation and coagulation of the protein.

The reduction in volume within the extruder has an appreciable effect on the kind of fiber produced. As the volume in the channel is decreased, longer, stringier fibers are developed. In extruding a given formulation, such as used in Example I, a 2:1 reduction in volume gives a fibrous fleshy meat-like strip having more tissue layer, whereas a 5:1 reduction in volume gives a material with fewer layers but having longer fibers.

The total moisture content of the dough entering the extruder (as is) may vary from about 20% to about 65% water. Higher moistures, usually around 45%, are useful in preparing a fish-like texture having relatively short, unaligned fibers. It is believed that the high moisture content allows greater mixing of the plastic mass during coagulation and dilutes the protein content of the dough sufficiently to reduce the degree of stretching and alignment of the fibers during coagulation. A good seafood texture is obtained employing a dough containing about 20% – 45% wheat gluten and about 38% – 49% water processed at a temperature of about 275° to 325° F using a 1 X reduction in volume during coagulation. The fiber length is increased by using higher amounts of wheat gluten and higher temperatures within the preceding range without orienting the fibers.

To prepare an aligned, fibrous protein, a dough consisting of wheat gluten levels of 20% – 75% (dry basis) and 25% – 38% water, is processed at temperatures of 275° F to 390° F using screw volume reduction of about 1 X to 5 X. Decreasing the volume reduction of the screw within the preceding range, provides a fleshy, aligned, fibrous product; while increasing the volume reduction provides a long, stringy, fibrous product. These aligned structures are most applicable in simulating naturally existing, meat-type, muscle structures.

The product prepared by this process is dense and substantially unpuffed (less than 10% and preferably less than 5% volume change on issuing from the extruder) although surface and internal bubbles may be present and are believed to be caused by evaporation of water.

Due to the difficulty in preserving the strips of this material in the moist, as extruded form, the strips of material are preferably dehydrated before further processing. It is possible, however, in a continuous operation to employ the fibrous strips directly from the extruder. The strips, when dehydrated, are brought to a moisture content of less than about 6%, and preferably less than about 4%.

Whether or not the strips are dehydrated, it is usually necessary to hydrate them before further processing to a moisture content of about 65%. This is achieved simply and effectively by soaking them in hot water. Typically, temperatures above about 150° F, and times of from about 5-25 minutes, are effective; however, the exact time and temperature for the soaking operation is easily determined for the particular strips being employed by those of ordinary skill in the art. It is desirable to cut the strips into the desired lengths, say about 6 inches, before hydration. It is, of course, to be understood by those skilled in the art that the hydrating liquid can contain flavoring materials, seasoning, preservatives, fats and oils, and the like, added in known manner and for their known purpose. It is, of course, an advantage of the present invention that, by impregnating the strips after coagulation of the protein in the strips but before adding the egg albumen binder, the flavoring material is locked into the meat-like structure and is not easily displaced or leached therefrom during subsequent cooking steps, even in the presence of large amounts of liquid.

After hydration, the strips are placed in a bath of liquid, albumen-based binder material which also preferably contains other additive materials. Numerous binder formulations are known to those skilled in the art. Those disclosed in the above-identified patents to Carp et al. and Hartman are specifically incorporated by reference. According to the preferred embodiment of the present invention, the protein strips are fibrillated after hydration and before soaking in the binder material. By fibrillation is meant a mechanical working of the strips to cause finite cleavages in the strip in the direction of fiber formation to partially separate the fibers within the strips into a net-like array of voids and interconnected fibers and filaments. The binder material, when soaked into the strips, will fill these voids in the fibrillated strip to provide gradations in texture more nearly simulating that of natural meat. It is noted, however, that the fibrillating step is only preferable and, while it produces a more desirable product, can be eliminated where the thickness of the strips is either maintained by extrusion or reduced after extrusion to a thickness of less than about 0.10 inches. The important discovery here being that the fibrosity achieved by the extrusion of the strips can more nearly be made to approximate that of natural meat where the layers or groups of fibers, thus, formed are separated from each other by the binder material. Thus, while it would be the ordinary inclination of the skilled worker to extrude the strips as closely as possible to the size of the chunks of loaf which he intended to make, it has been found according to the present invention that the texture can be yet further improved over prior art textures by interrupting large masses of the fibrous material by binder material.

Where natural egg whites are employed as the binder material without any additives or dilution of the egg whites, it is desirable to allow the strips plenty of time to reach equilibrium with the liquid egg white. Typically, times of from about 1 to 3 hours are satisfactory. Where the binder solution is more watery and less cohesive than the natural egg white, it is, of course, possible to soak for shorter periods of time.

After the strips are fully saturated with the binder material, they are aligned, preferably in undirectional orientation in a mold, for setting of the binder. In the placement of the strips in the mold, it is necessary to employ only as much pressure as is needed to prevent the formation of voids. Care should be taken during the alignment of the strips in the molds to obtain the proper orientation relative to the plane upon which the final product is to be severed or sliced.

The aligned strips soaked with binder are then heated in the mold for a period of time sufficient to fully coagulate the protein binder material. For example, a mold filled to a depth of about 4 inches is expeditiously heated by baking it in an ordinary convection oven at a temperature of from about 225°–250° F for a period of from about 1-2 hours. It is possible, but not necessary, to the present invention to employ a limited degree of pressure to the product in the mold during heating. In most cases, the use of pressure counteracts natural expansion and moisture evolution. Preferably, however, the molded material is heated by subjecting it to microwave energy. Unexpectedly, heating with microwave energy causes an overall shrinkage and tightening of the simulated meat structure which significantly improves the overall texture of the system. Thus, the microwave heating yields a good uniformity of set without significant moisture loss. Typical of the microwave devices which can be employed are the Amana Radarange and the 2½ KW Amperex. The molded material is preferably heated to an internal temperature of from about 140° to about 180° F to assure satisfactory coagulation of the proteinaceous binder material.

To aid in further processing of the materials so produced, it is usually desirable to refrigerate the products before further treatment. Slicing and packaging are facilitated by reducing the product temperature to below about 40° F. The products prepared according to the present invention have a very natural appearance of meat-like fibrosity or texture when sliced. The direction of cut will greatly affect the structure, texture, and appearance of the slice. Diagonal slicing, i.e. at an angle to the direction of orientation, provides a distinctive product having a texture and appearance closely approximating London broil.

The following examples are presented for the purpose of further explaining and illustrating the present invention and are not to be taken as limiting in any sense. Unless otherwise indicated, all parts and percentages are by weight.

EXAMPLE I

A mixture of wheat gluten (60%), ground soy grits (25%), wheat flour (12.6%), ammonium carbonate (0.4%), and salt (2%) is dry blended, and an amount of water equal to 30% of the final weight of the mix is added. The total mix is blended in a Sigma mixer for 20 minutes. The blend is then force fed into a ¾ inch Brabender laboratory extruder having a 25:1 L:D ratio screw. The die section and torpedo is removed to prevent pressure drop causing a volume change or disruption of the continuous aligned fibrous product. The extruder barrel consists of three heating zones with barrel temperatures of 244°, 310°, and 330° F from inlet to outlet, respectively. The 2/1 screw, producing a 2:1 (1 X) volume reduction within the extruder, is rotated at 40 RPM. Dough at 55° F entering the extruder remained therein for approximately 55 seconds and exited at 255° F (29 gms/min. at 17% moisture). The exiting product is a long, continuous substantially unpuffed ribbon with a fibrous, aligned texture. These strips are cut into 6 inch segments, hydrated in boiling water to a moisture content of 65%, and then soaked in fresh albumen for three hours. The binder impregnated strips are then layered parallel to each other to a thickness of 2 inches in a pan and baked at 225° F to 250° F for 1½ hours. Following baking, a very fleshy, aligned fibered texture is apparent.

EXAMPLE II

The procedure of Example I is repeated, but this time: (1) the strips are fibrillated after hydration in water at 200° F for 10 minutes; and (2) the strips are soaked in the egg albumen for only 2 hours. The product is similar to that of Example I, but more meat-like in character due to the textural advantages and a more well-marbled appearance afforded by the fibrillation of the strips.

EXAMPLE III

The procedure of Example II is repeated but this time heat setting done using microwave energy. The layered strips with binder are constantly rotated in an Amana Radarange for six minutes. The texture of this product is improved over that of Example II due at least in part to a partial shrinkage and densification of the product.

Many modifications and variations of this invention will become apparent to those skilled in the art upon reading the above disclosure. It is intended that all such modifications and variations be included within the scope of the invention which is defined by the following claims:

What is claimed is:

1. An improved process for preparing a meat analog comprising the steps of:
   a. forming a plurality of substantially unpuffed, fibrous protein strips by:
      i. preparing an aqueous mixture containing heat coagulable protein,
      ii. adjusting the water content of the mixture to within the range of from 20% to 65% by weight to obtain an aqueous proteinaceous dough mixture,
      iii. compressing the dough while passing it through a heated chamber of decreasing volume, thereby simultaneously elongating and heating the dough while under compression to form thermally coagulated fibrous strips having fiber alignment in the direction of the channel, and
      iv. releasing the compression on the strips such that they are not substantially puffed and maintain the fibrous nature;
   b. fibrilating the strips to partially separate the fibers within the strips;
   c. soaking the strips in a binder medium comprising egg albumen;
   d. layering the strips to align the fibers and to substantially eliminate voids; and
   e. heat setting the binder.

2. A process according to claim 1 wherein heat setting is done employing microwave energy.

* * * * *